US008880285B2

(12) United States Patent
Miners et al.

(10) Patent No.: US 8,880,285 B2
(45) Date of Patent: Nov. 4, 2014

(54) FLEXIBLE COACHING PLATFORM FOR TELEMATICS SYSTEM

(75) Inventors: William Ben Miners, Guelph (CA); Hani Hawari, Waterloo (CA); Jason Toonstra, Elmira (CA); Daniel Evan Lajeunesse, Aurora (CA)

(73) Assignee: Intelligent Mechatronic Systems Inc., Waterloo, Ontario (CA)

( * ) Notice: Subject to any disclaimer, the term of this patent is extended or adjusted under 35 U.S.C. 154(b) by 81 days.

(21) Appl. No.: 13/230,784

(22) Filed: Sep. 12, 2011

(65) Prior Publication Data

US 2012/0232747 A1 Sep. 13, 2012

Related U.S. Application Data

(60) Provisional application No. 61/381,978, filed on Sep. 11, 2010.

(51) Int. Cl.
*G01M 17/00* (2006.01)
*G07C 5/00* (2006.01)

(52) U.S. Cl.
CPC ................ *G07C 5/008* (2013.01); *G07C 5/006* (2013.01)
USPC ......................................... 701/33.9; 701/29.2

(58) Field of Classification Search
USPC ............... 701/123, 45, 29.1–29.9, 33.1–33.9; 715/701; 700/91; 369/126
See application file for complete search history.

(56) References Cited

U.S. PATENT DOCUMENTS

| | | | | |
|---|---|---|---|---|
| 6,868,386 | B1 | 3/2005 | Henderson et al. | |
| 6,909,947 | B2 | 6/2005 | Douros et al. | |
| 6,925,425 | B2 | 8/2005 | Remboski et al. | |
| 6,931,309 | B2 | 8/2005 | Phelan et al. | |
| 7,765,058 | B2 | 7/2010 | Doering | |
| 7,798,578 | B2 | 9/2010 | Lewis et al. | |
| 7,825,003 | B2 | 11/2010 | Gauthier, Jr. et al. | |
| 2007/0271105 | A1 | 11/2007 | Gunderson et al. | |
| 2008/0243558 | A1 | 10/2008 | Gupte | |
| 2009/0105897 | A1 * | 4/2009 | Breslau et al. | 701/29 |
| 2010/0030458 | A1 | 2/2010 | Coughlin | |
| 2011/0112717 | A1 | 5/2011 | Resner | |

* cited by examiner

*Primary Examiner* — Thomas G Black
*Assistant Examiner* — Luke Huynh
(74) *Attorney, Agent, or Firm* — Carlson Gaskey & Olds P.C.

(57) ABSTRACT

A telematics system provides a platform for generating coaching tips, feedback, and simple indices based on driving behavior, historical information, heursistics and expert knowledge. The coaching tips are displayed on the policyholder portal and text describing the tips is completely configurable by an administrator on the server for the application. Furthermore, both ‘driving behavior’ and ‘environmentally friendly (green) driving’ tips can be supported.

16 Claims, 2 Drawing Sheets

FLEXIBLE COACHING PLATFORM FOR TELEMATICS SYSTEM

This application claims priority to U.S. Provisional Application Ser. No. 61/381,978, filed Sep. 11, 2010.

BACKGROUND

Some telematics systems monitor vehicle and driver events and conditions. A device installed in the vehicle may include one or more on-board sensors, such as accelerometers (such as a three-axis accelerometer), a gps receiver, etc. The device may receive further information from the vehicle's on-board diagnostics port (e.g. OBD-II), including vehicle speed. This information, or summaries thereof, may be sent to a server (or multiple servers) for collection and analysis. One way this information can be used is for determining a rate of car insurance that should be charged for the driver and/or vehicle. Some of this information is made available to the driver and/or vehicle owner, such as via a web browser (or via the internet through a dedicated application).

SUMMARY

This system provides a platform for generating coaching tips, feedback, and simple indices based on driving behavior, historical information, heuristics and expert knowledge. The coaching tips are displayed on the policyholder portal and text describing the tips is completely configurable by an administrator on the server for the application. Furthermore, both 'driving behavior' and 'environmentally friendly (green) driving' tips can be supported.

DETAILED DESCRIPTION

Figure 1:
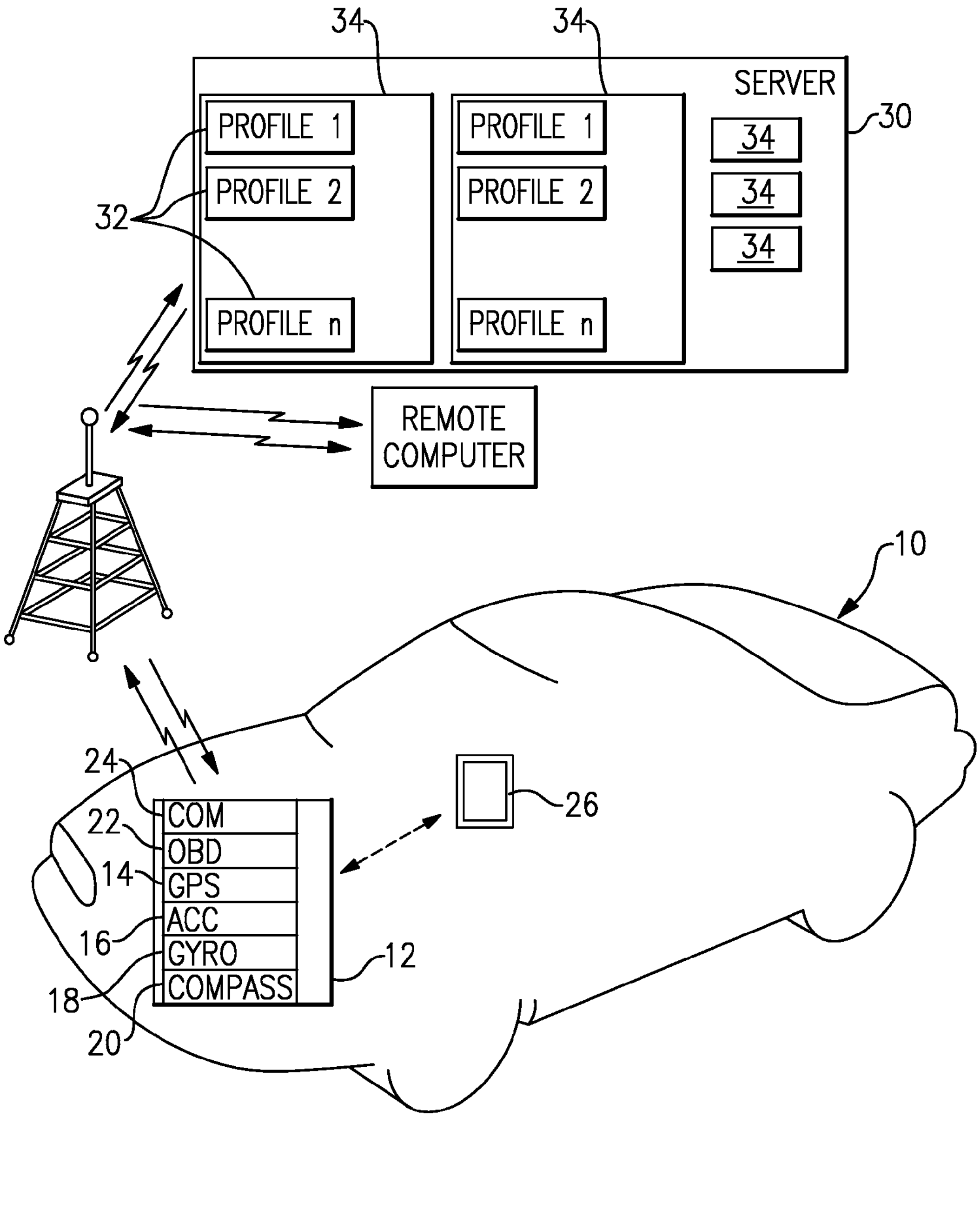
FIG. 1 is a schematic of a monitoring system according to one embodiment of the present invention.

Referring to FIG. 1, a motor vehicle 10 includes a plurality of data gathering devices that communicate information to an appliance 12 installed within the vehicle 10. The example data gathering devices include a global positioning satellite (GPS) receiver 14, an accelerometer 16, a gyroscope 18 and an electronic compass 20, which could be housed within the appliance 12 (along with a processor and suitable electronic storage, etc). As appreciated, other data monitoring systems could be utilized within the contemplation of this invention. Data may also be collected from an onboard diagnostic port (OBD) 22 that provides data indicative of vehicle engine operating parameters such as engine speed, temperature and other information that is related to mechanical operation of the vehicle. Moreover, any other data that is available to the vehicle could also be communicated to the appliance 12 for gathering and compilation of the operation summaries of interest in categorizing the overall operation of the vehicle. Not all of the sensors mentioned here are necessary, however, as they are only listed as examples.

The appliance 12 may also include a communication module 24 (such as cell phone, satellite, wi-fi, etc) that provides a connection to a wide-area network (such as the internet). Alternatively, the communication module 24 may connect to a wide-area network (such as the internet) via a user's cell phone 26 or other device providing communication.

The in vehicle appliance 12 gathers data from the various sensors mounted within the vehicle 10 and stores that data. The in vehicle appliance 12 transmits this data (or summaries thereof) as a transmission signal through a wireless network to a server 30. The server 30 utilizes the received data to categorize vehicle operating conditions in order to determine or track vehicle use. This data can be utilized for tracking and determining various parameters such as driver behavior, insurance premiums for the motor vehicle, tracking data utilized to determine proper operation of the vehicle and other information that may provide value such as alerting a maintenance depot or service center when a specific vehicle is in need of such maintenance. Driving events and driver behavior are recorded by the server 30, such as fuel and/or electricity consumption, speed, driver behavior (acceleration, speed, etc), distance driven and/or time spent in certain insurance-risk coded geographic areas. For example, the on-board appliance 12 may record the amount of time or distance in high-risk areas or low-risk areas, or high-risk vs low risk roads.

The server 30 includes a plurality of profiles 32, each associated with a vehicle 10 (or alternatively, with a user). Among other things, the profiles 32 each contain information about the vehicle 10 (or user) including some or all of the gathered data (or summaries thereof). Some or all of the data (or summaries thereof) may be accessible to the user via a computer 32 over a wide area network (such as the internet) via a policyholder portal, such as fuel efficiency, environmental issues, location, maintenance, etc. The user can also customize some aspects of the profile 32. The user also receives "coaching tips" on the policyholder portal that are based upon driving behavior, historical information, heuristics and expert knowledge. The coaching tips are displayed to the user on the policyholder portal.

The text describing the tips and the conditions under which the tips are offered are completely configurable by an administrator, such as an administrator at the insurance company 34. Both 'driving behavior' and 'environmentally friendly (green) driving' tips can be supported.

It should be noted that the server 30 may be numerous physical and/or virtual servers at multiple locations. The server 30 may collect data from appliances 12 from many different vehicles 10 associated with a plurality of insurance companies 34. Each insurance company 34 (or other administrator) may configure parameters, such as the flexible coaching tips, only for their own users. The server 30 permits the administrator of each insurance company to access only data for their policyholders. The server 30 permits each policyholder to access only his own profile 32 and receive only the coaching tips generated by the server 30 based upon the configuration by that user's insurance company 34 administrator.

Flexible Coaching Platform Parameters

Figure 2:
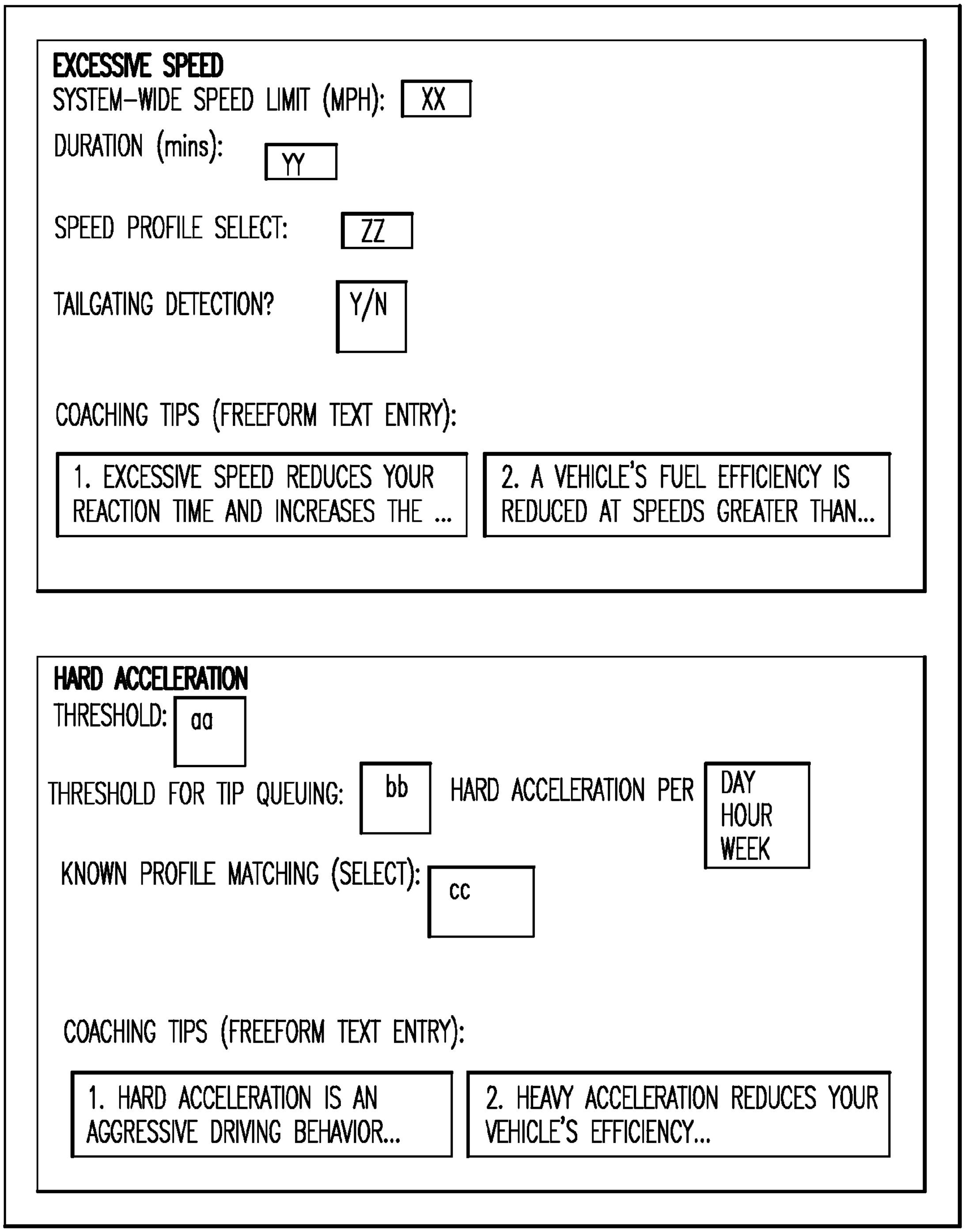
FIG. 2 is a sample user interface for the administrator to configure some of the coaching tips.

The following section details selected information sources and associated configuration parameters. FIG. 2 is a sample user interface for the administrator to configure some of the coaching tips.

Excessive Speed

The server 30 is able to track excessive speed events. Excessive speed is defined by multiple parameters configurable by the administrator, including:

1. Speed limit—a system wide configuration applied to all policyholders, i.e., 85.0 MPH.
2. Duration of event, i.e., length of time in which the vehicle speed exceeds the defined limit.
3. Speed profile, including tailgating detection.

When vehicle driving behavior triggers an excessive speed event a coaching tip for this type is queued. The coaching tips are also configurable by the administrator.

Sample Coaching Tips

'Excessive speed reduces your reaction time and increases the likelihood of being involved in a collision. Obey all posted speed limits and reduce speed if warranted by weather or other conditions.'

'A vehicle's fuel efficiency is reduced at speeds greater than the speed limit. Avoid excessive speeds and try to maintain a constant speed.'

Hard Acceleration Events

The server 30 accumulates the number of hard acceleration events on a per trip basis which is normalized over the number of miles driven during that trip.

Parameters configurable by the administrator associated with this event type include:

1. Hard acceleration threshold.
2. Threshold for coaching tip queuing.
3. Known pattern matching in acceleration profile(s).

Sample Coaching Tips

'Hard acceleration is an aggressive driving behavior which increases your chances of being involved in a collision.'

'Heavy acceleration reduces your vehicle's fuel efficiency. Your vehicle's acceleration should be smooth and not excessive.'

Hard Braking Events

The server 30 accumulates the number of hard braking events on a per trip basis which is normalized over the number of miles driven during that trip.

Parameters configurable by the administrator associated with this event type include:

1. Hard braking threshold.
2. Threshold for coaching tip queuing.
3. Known pattern matching in deceleration profile(s) (including "tailgating").

Proposed Coaching Tips

Possible coaching tips include:

'Following a vehicle too closely increases your chances of being involved in a collision; follow a safe distance from the vehicle ahead is maintained.'

'Road conditions can change unexpectedly. Ensure you have enough space between you and the vehicles around you to stop.'

Malfunction Indicator Lamp (MIL) Status ON

The vehicle's Malfunction Indicator Lamp (MIL) or 'Check Engine Light' can be monitored. The vehicle's emission system is not functioning properly if the MIL is illuminated meaning that excessive vehicle pollution and a potential decrease in fuel efficiency is occurring. How and whether to provide coaching tips based upon the MIL status is configurable by the administrator on the server 30.

Sample Coaching Tips

'Your vehicle requires servicing. Ignoring this condition may decrease your vehicle's fuel efficiency.'

'An emissions system failure has been detected with your vehicle. Immediate attention will reduce the environmental impact of your driving.'

Decreasing Fuel Economy

The server 30 is able track decreases in vehicle fuel efficiency month-to-month. A coaching tip will be queued if the vehicle's fuel efficiency drops below some configurable threshold between two consecutive months. The threshold is configured to account for seasonal and other effects on fuel efficiency.

Consideration is given to cases when the policyholder changes the enrolled vehicle. In these cases, the month-to-month comparison is suspended until enough data is collected for the new vehicle. The threshold and time periods are configurable by the administrator on the server 30, as are the coaching tips.

Sample Coaching Tips

'A decrease in your vehicle's fuel efficiency has been detected, ensure your vehicle's tires are properly inflated and consider checking your engine's air filter if it has been replaced recently.'

'A change in your vehicle's fuel efficiency has been observed. Has your driving behavior changed significantly from last month?'

Time-of-Day

A configurable system-wide time-of-day window can be defined in which a coaching tip will be queued on a weekly basis if the vehicle is driven during this period. Consideration is given to drivers that must drive during this period and coaching tips will be suppressed if some limit (configurable by the administrator on the server 30) is exceeded on a weekly basis.

Sample Coaching Tips

'Driving between the hours of 12 AM and 4 AM increases your chances of being involved in a severe collision. Consider avoiding driving during this period.'

'If at all possible, shift your driving pattern outside of 'rush hour' periods to reduce your chances of being involved in a collision.'

Vehicle Idling

Vehicle idling is defined as periods in which the vehicle's engine is running but vehicle speed is zero. Extended periods of idling contribute to increased Greenhouse Gas (GHG) emissions and reduced vehicle fuel efficiency. A coaching tip will be queued once the idle period (configurable by the administrator on the server 30) is exceeded.

Related idling information includes:

The number of extended idling events.

the environmental impact in terms of carbon emissions.

the amount (and average cost) of lost fuel due to unnecessary idling.

Sample Coaching Tips

'Turning your vehicle's engine off when waiting will result in fuel usage savings.'

'Consider turning your vehicle's engine off instead of idling to reduce Green House Gas emissions.'

Mileage

The server 30 is able to measure a vehicle's mileage driven. A monthly threshold (configurable by the administrator on the server 30) is used to queue a coaching tip of this event type. High mileage drivers may be classified as higher risk and need additional/enhanced insurance coverage.

Sample Coaching Tips

'Your vehicle mileage driven is higher than expected. Please contact your insurance agent or broker to ensure your coverage is appropriate.'

'To reduce your vehicle mileage driven, consider car pooling or public transit if possible.'

Policyholder Defined Notification Events

It is possible to generate coaching tips when a limit (configurable by the administrator on the server 30) of policyholder managed notification events is exceeded on a daily basis. These notification events include:

Time-of-day

Over-speed

Geo-fence violations.

This "meta-event-source" is targeted for new or new driver programs.

Sample Coaching Tip

'An increased number of notification events have been detected. If this is a result of a new or teen driver, consider having a discussion on safe driving behaviors.'

In-Vehicle Device Connect Disconnect Events

A coaching tip is queued each time the in-vehicle appliance 12 is disconnected and reconnected to the vehicle 10. It is important that the policyholder leave the appliance 12 installed in the vehicle 10 at all times to maximize the effectiveness of the appliance 12 and the data collected.

Sample Coaching Tips

'Leaving the in-vehicle telematics device installed at all times increases your potential for insurance premium savings.'

'Disconnecting the in-vehicle telematics device from your vehicle may result in lost higher insurance costs.'

Available System Configuration Options

Event Type Weighting

Each event type can is assigned a weighting parameter (configurable by the administrator on the server 30) to ensure the coaching tips associated with the most severe and/or relevant events are displayed on a more frequent basis.

Flexible Coaching Tip Text Display

All events allow for administrator definable coaching tip text. In addition, each event triggering coaching tips can have several tips associated with it to maximize impact. Length limits will apply but will be reasonable to allow the conveying of meaningful coach tips.

Each event type can have both a 'green' and 'driving' coaching tip associated with it. If a coaching tip type is not required, it can be disabled.

For most of the parameters, it is possible to make use of the following statistics as triggers to generate coaching tips:

an event count an average event count per mile comparison to the previous month comparison to the overall user history comparison to the average value of all program participants Charts and graphs can be used to plot some of these statistics to illustrate a specific driving behavior and provide a visual context to the associated coaching tips.

Generic Coaching Tips

It is possible to have generic coaching tips that are not associated with triggered event tips to be displayed. These coaching tips may cover items such as seasonal driving, defensive driving, etc. The coaching tips may be generated based upon date (season), weather, or randomly and may be prioritized relative to the event-driven coaching tips (e.g. excessive speed may be prioritized over a general winter weather driving coaching tip).

Additional Features

Coaching tips can also be forwarded as text messages, email, or via audible phone calls to a policyholder or designate(s) at an appropriate time. Delivery is queued for delivery on trip completion, or paced at regular intervals (i.e. daily or weekly). Tips of this type are particularly valuable when deployed for teen driving programs or policyholders with teen or new drivers.

Experience-Based Index

The coaching platform is also leveraged to support an "experienced-based" index. This index is constructed using flexible rules to combine and weight multiple direct inputs, historical inputs, and external knowledge. The flexibility and complete transparency of this system enables the insurance carrier to optimize the experience-based index to suit one or more goals, whether it is safety-focused, green-focused, cost-focused (i.e. fuel price/TCO), or a combination of these or other goals entirely.

The experience-based index can leverage: exceptions in driving behavior (anomalies), historical driving behaviors for an individual (compensating for seasonal and vehicle variations), peer-group driving behaviors for one or more related peer-groups, expert knowledge and 3rd party information, including EPA information, fuel prices, and information from a range of static or dynamic sources, outputs are available in raw form for integration, in visual form, and in a form suitable for direct comparisons across multiple local or remote indices.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A method for providing feedback including the steps of:

a) monitoring driving behavior with at least one sensor in a vehicle;

b) transmitting the driving behavior to a computer;

c) the computer receiving an input from an administrator adjusting at least one threshold;

d) the computer comparing the driving behavior to the at least one threshold after said step c);

e) the computer generating at least one suggestion based upon the comparison in said step d); and f) communicating the at least one suggestion to the driver of the vehicle or an owner of the vehicle.

2. The method of claim 1 wherein the computer is a server remote from the vehicle and wherein the administrator can adjust the at least one threshold on the server.

3. The method of claim 1 wherein the computer is a server remote from the vehicle, the method further including the step of receiving the at least one threshold from an administrator on the server.

4. The method of claim 3 further including the step of receiving the at least one suggestion from the administrator on the server.

5. The method of claim 1 wherein the at least one threshold includes a speed threshold.

6. The method of claim 1 wherein the at least one threshold includes a hard acceleration threshold.

7. The method of claim 1 wherein the at least one threshold includes a mileage threshold.

8. The method of claim 1 wherein the at least one threshold includes a vehicle idling time threshold.

9. The method of claim 1 wherein the at least one threshold is a fuel efficiency change threshold that is based upon a change in a fuel efficiency of the vehicle over time.

10. The method of claim 9 wherein the fuel efficiency change threshold is adjusted based upon season.

11. The method of claim 1 wherein the at least one threshold is based upon a number of times that a monitoring device in the vehicle has been disconnected.

12. The method of claim 1 wherein the at least one threshold includes a plurality of thresholds and further including the step of receiving a weighting of the plurality of thresholds, and wherein said step f) includes determining which suggestion to communicate based upon the weighting.

13. The method of claim 1 wherein the at least one threshold is based upon historical driving behavior and wherein the step of comparing includes comparing driving behavior to historical driving behavior.

14. The method of claim 2 wherein the server includes a plurality of thresholds including the at least one threshold and wherein the plurality of thresholds are associated with a plurality of companies, and wherein the server permits the administrator to adjust the at least one threshold associated with only one of the plurality of companies.

15. The method of claim 14 wherein the server permits other administrators to adjust thresholds associated with other ones of the plurality of companies.

16. The method of claim 12 wherein the weighting of the plurality of thresholds is adjustable by the administrator.

* * * * *